(12) United States Patent
Gertitschke et al.

(10) Patent No.: US 8,485,807 B2
(45) Date of Patent: Jul. 16, 2013

(54) DEVICE AND METHOD FOR THERMOFORMING A SHEET

(75) Inventors: Detlev Gertitschke, Laupheim (DE); Anton Singer, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 339 days.

(21) Appl. No.: 12/775,710

(22) Filed: May 7, 2010

(65) Prior Publication Data
US 2010/0308508 A1 Dec. 9, 2010

(30) Foreign Application Priority Data

Jun. 5, 2009 (EP) .................. 09162065

(51) Int. Cl.
*B29C 51/42* (2006.01)

(52) U.S. Cl.
USPC .............. 425/174; 425/174.8 R; 425/347; 425/359; 425/385; 425/395

(58) Field of Classification Search
USPC .............. 425/174, 174.8 R, 385, 394–395, 425/358, 359, 347
See application file for complete search history.

(56) References Cited

U.S. PATENT DOCUMENTS

| | | | | |
|---|---|---|---|---|
| 3,837,782 A | * | 9/1974 | Meissner et al. | 425/347 |
| 6,914,225 B2 | * | 7/2005 | Fischer et al. | 219/634 |
| 8,021,135 B2 | * | 9/2011 | Anbarasu et al. | 425/3 |
| 2002/0185767 A1 | | 12/2002 | Barker | |
| 2007/0063385 A1 | * | 3/2007 | Carsley et al. | 264/324 |

FOREIGN PATENT DOCUMENTS

DE 19915254 A1 10/2000

OTHER PUBLICATIONS

European Search Report—Feb. 17, 2010.

* cited by examiner

*Primary Examiner* — Richard Crispino
*Assistant Examiner* — Thukhanh Nguyen
(74) *Attorney, Agent, or Firm* — Brinks Hofer Gilson & Lione

(57) ABSTRACT

The device for thermoforming a sheet has two molds. The first mold includes a movable plug support plate and heated plugs projecting from the plug support plate, which plugs are spaced a predetermined distance apart. A plurality of induction coils is arranged stationary in an area of the device adjacent to the plug support plate, and the plug support plate has an induction element of inductively heatable material.

12 Claims, 3 Drawing Sheets

DEVICE AND METHOD FOR THERMOFORMING A SHEET

CROSS-REFERENCE TO RELATED APPLICATIONS

The present patent document claims the benefit of priority to European Patent Application No. EP 09162065.8, filed Jun. 5, 2009, and entitled "DEVICE AND METHOD FOR THERMOFORMING A SHEET," the entire contents of each of which are incorporated herein by reference.

FIELD OF THE INVENTION

The invention relates to a device and to a method for thermoforming a sheet.

BACKGROUND

Devices of this type are used in, for example, the pharmaceutical industry to produce blister sheets, in which pockets for holding tablets must be formed. The thermoforming of sheets is used in many other industries as well.

Many different methods are available for thermoforming a sheet, including those based on the use of compressed air or a vacuum and those based strictly on forming over a male mold. When a sheet is thermoformed by means of compressed air, plug assists are used to guarantee uniform wall thicknesses and to support the forming process, depending on the type of sheet material, the thickness of the sheet, and the diameter/depth ratio of the pockets to be formed.

The plugs are heated so that the heated sheet does not cool down on contact with them. When thermoforming is carried out with compressed air, the plugs are located in the pressure space of the mold and are heated by means of cartridge heaters. This requires cable connections, which are subjected to bending stress as a result of the constant upward and downward movement of the plugs. If a cable breaks, the mold must be removed, and the defective parts such as cables or cartridge heaters must be replaced. Such failures are always unplanned and require that production be interrupted.

BRIEF SUMMARY OF THE INVENTION

It is an object of the present invention to provide a device for thermoforming a sheet which is especially robust and contains no moving electrical components in the mold. In addition, a corresponding method for thermoforming a sheet is also to be provided.

The device for thermoforming a sheet comprises first and second molds, the first mold comprising a plug support plate and a plurality of heated plugs projecting from the plug support plate, the plugs arranged at predetermined distances from each other. In the area adjacent to the plug support plate, a plurality of stationary induction coils is arranged, and the plug support plate comprises at least one induction element made of inductively heatable material.

Thus moving cable connections, which are susceptible to failure, are avoided, and the robustness and compactness of the device are improved.

The alternating magnetic field of the induction coils preferably comprises a frequency range of 25 to 50 kHz. Thus an output of 400 to 800 W is generated in the induction element or elements, which is highly suitable for heating the plug support plate and the plugs.

To execute the thermoforming process by means of compressed air, the first mold comprises preferably a stationary housing, in which the plug support plate is movably supported and in which the stationary induction coils are arranged. The housing also comprises through-openings for the plugs.

In a first embodiment, the at least one induction element is designed as a thin plate, which is connected in a thermally conductive manner to a base body of the plug support plate. This makes it possible for a large area of the induction element to be heated and for the generated heat to be conducted continuously to the base body of the plug support plate and thus to the plugs.

In an alternative embodiment, several induction elements are provided, which are designed as electrical strip conductors. In this case, the strip conductors can be arranged in straight lines and spaced a predetermined distance apart on the base body of the plug support plate to guarantee the production of enough heat. The strip conductors are preferably produced out of material which can be heated easily by induction but in which only relatively small currents are generated.

In a design such as this, it has been found cost-effective for the strip conductors to be designed as round bars or square bars and to be introduced into recesses in the base body of the plug support plate, preferably press-fitted into these recesses. As a result, a heat-conducting connection is easily established between the induction elements and the base body of the plug support plate.

To ensure adequate heat output, the at least one induction element is preferably made of a material of high electrical conductivity, preferably iron.

To ensure the conduction of the heat generated in the induction element to the plugs, the plug support plate comprises a base body of a heat-conducting material, preferably aluminum.

For the control and automatic regulation of the induction coils, a sensor is provided to measure the temperature, this sensor being preferably arranged in a permanent position in the mold and preferably working without contact. Thus, in a simple way, deviations in the temperature can be detected and corrected by the appropriate automatic control of the induction coils.

One method for thermoforming a sheet comprises:
providing a thermoplastic sheet, preheated to forming temperature, between first and second molds,
heating the plugs of the first mold by induction heating,
prestretching the sheet by means of the heated plugs, and
forming pockets in the sheet by means of compressed air.

In this way, the number of mechanically stressed components in the first mold is reduced, and a robust, user-friendly method for thermoforming a sheet is created.

BRIEF DESCRIPTION OF THE DRAWINGS

Additional details and advantages of the present invention can be derived from the following description, which makes reference to the drawings.

DETAILED DESCRIPTION OF SPECIFIC EMBODIMENTS

Figure 1:
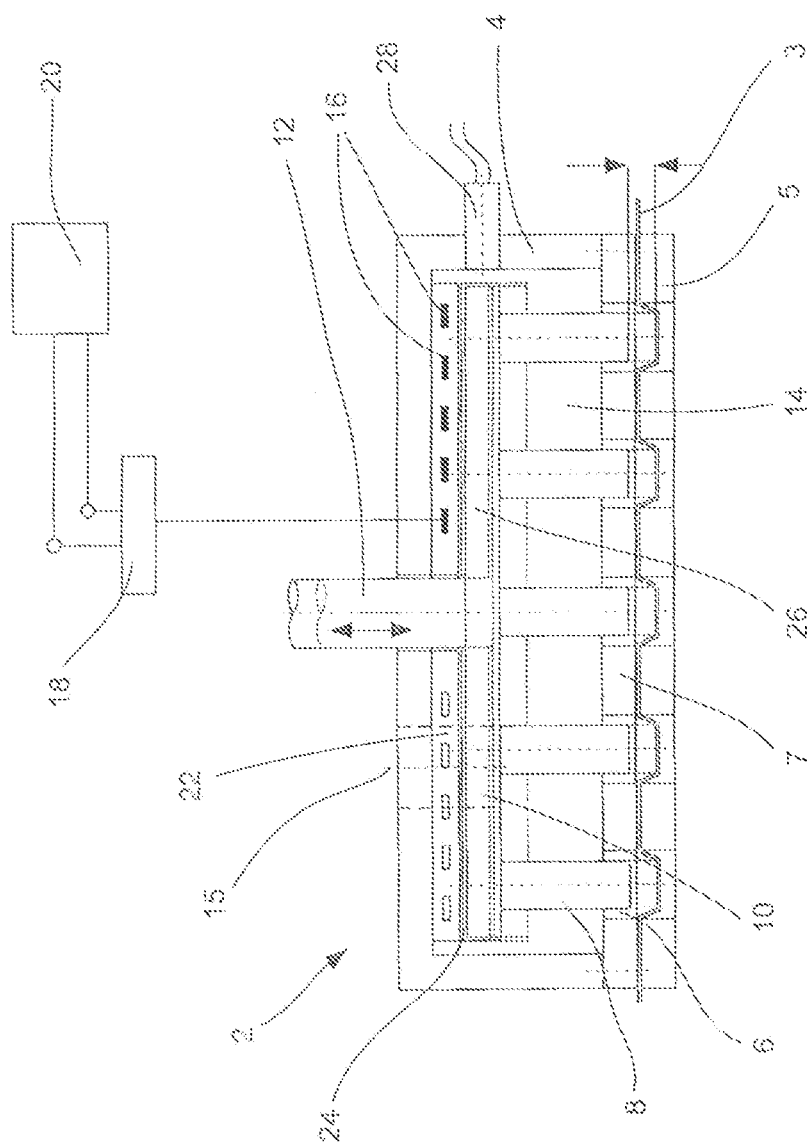
FIG. 1 is a cross-sectional view of a first embodiment of the device for thermoforming a sheet.

FIG. 1 is a cross-sectional view of an embodiment of the device for thermoforming a sheet. The device comprises a first mold 2, which, in the present case, is designed to form pockets in a sheet 3, here blister sheet material, by means of compressed air, and a second mold 5 as a counterpart to the first mold 2.

The first mold 2 comprises a stationary housing 4, which can consist of aluminum, for example. In the present case, the housing 4 comprises a pressure plate 7 at the bottom with through-openings 6 for heatable plugs 8, which serve as pre-stretching plugs. The plugs 8 are connected to a plug support plate 10, which for its own part can be moved up and down by a drive 12, such as a pneumatic cylinder.

As a result of the upward and downward movement of the plugs 8, pockets are first preformed in the sheet 3; then, a positive pressure of, for example, 6 bars is generated in a pressure space 14 in the interior of the housing 4 by way of pressure ports 15, as a result of which the pockets then assume their final shape.

The plugs 8, which are used here as prestretching plugs, serve to guarantee uniform wall thicknesses and to support the forming process depending on the type of sheet, the thickness of the sheet, and the diameter/depth ratio. The plugs 8 are heated to prevent the heated sheet 3 from cooling down on contact with the plugs.

For this purpose, stationary induction coils 16 are arranged in an area of the device which is adjacent to the plug support plate 10. In the present example, they are mounted in the stationary housing 4 above the plug support plate 10. These induction coils 16 are driven and operated by a power section 18, which is under the control of a control element 20. For the sake of clarity, only one induction coil 16 is shown connected to the power section 18. In reality, of course, all of the induction coils 16 are connected to the power section 18.

The induction coils 16 generate an alternating magnetic field in a frequency range of 25 to 50 kHz. Ideally, the induction coils 16 are arranged in a housing 22 for the induction coils 16 and thus represent a finished assembly. As a result, it is easy to install or to replace or to repair the induction coils 16 or the entire housing 22 for the induction coils 16.

The area in which the induction coils 16 are arranged is adjacent to the outside surface of the plug support plate 10, i.e., the surface facing away from the plugs. There, an induction element 24 is arranged on a base body 26 of the plug support plate 10. The induction element 24 in the present case is designed as a thin plate, which is connected in a thermally conductive manner to the base body 26 of the plug support plate 10. The connection can be established, for example, by friction welding, by press welding, or by means of a thermally conductive adhesive bond.

The thin plate is preferably made of sheet metal or iron or some other electrically conductive material. In general, it is possible in particular to use any elementary metal or metal alloy of two or more metal components. The induction element 24 can also be coated with a passivation layer to protect it from chemical reactions with the environment, especially to protect it from oxidation.

Because of the alternating magnetic field and the movement of electrical charges thus produced in the induction element 24, the element is heated by induction, preferably with an output of 400 to 800 W. By thermal conduction, the heat generated in the induction element 24 is transmitted to the base body 26 of the plug support plate 10 and from there to the plugs 8. For this purpose, the base body 26 of the plug support plate 10 and the plugs 8 are preferably formed of a highly heat-conductive material such as aluminum.

Figure 2:
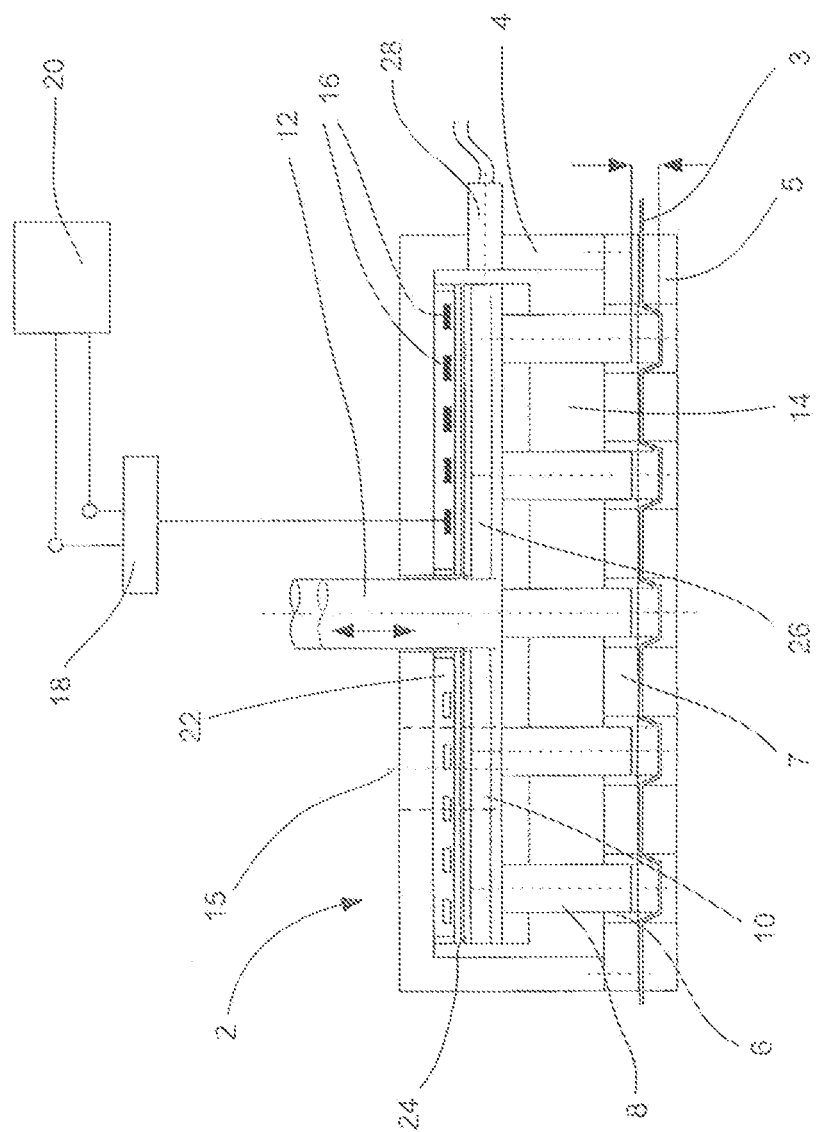
FIG. 2 is a cross-sectional view of an alternative embodiment of the device for thermoforming a sheet.
Figure 3:
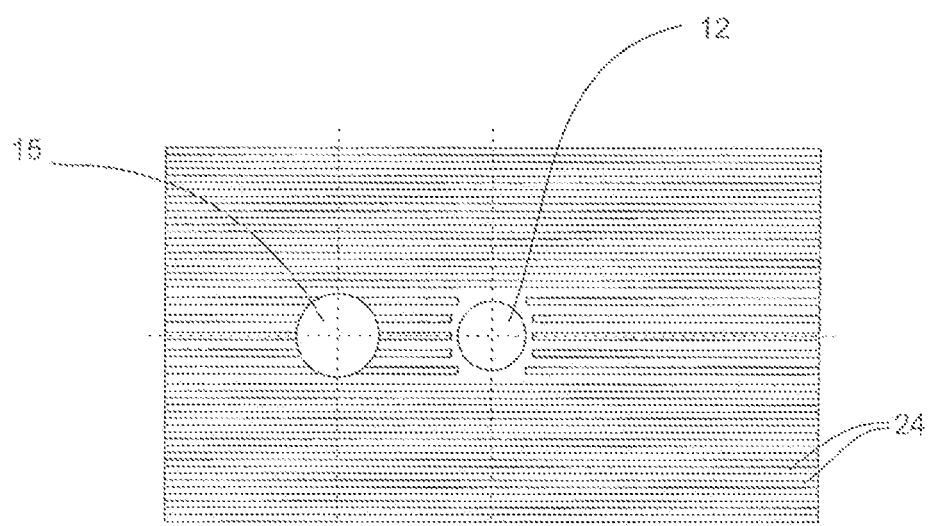
FIG. 3 is a top view of the plug support plate of the device according to FIG. 2.

FIGS. 2 and 3 show a similar embodiment of the device. Here, however, several induction elements 24 designed as strip conductors, spaced a certain predetermined distance apart, are present. These strip conductors 24 are also designed to be electrically conductive and are also connected in a thermally conductive manner to the base body 26 of the plug support plate 10. In a special embodiment, the strip conductors are designed for this purpose as round bars or square bars and are introduced, preferably pressed, into recesses in the base body 26 of the plug support plate 10. Distributing the strip conductors in this way guarantees sufficient and uniform heating of all the plugs 8.

FIG. 3 shows again the parallel orientation of the induction elements 24 designed as strip conductors according to the exemplary embodiment of FIG. 2. Many other possible arrangements of the induction elements 24 could also be imagined. For example, the strips could extend in the direction perpendicular to that shown here, or they could form a meandering loop or have some other similar type of geometry.

In the exemplary embodiment according to FIG. 2, furthermore, a sensor 28 for measuring the temperature is arranged in the area of the top dead center of the movement of the plug support plate 10. In the example shown here, the temperature is measured without contact, and the sensor is installed in a permanent position in an area of the housing 4 of the device. The measurement results of the sensor 28 are transmitted to the control element 20, which adjusts the induction coils 16 as necessary when there is a deviation from the nominal state. Of course, the sensor 28 can also be used in the embodiment according to FIG. 1, and it can also be installed in some other location in the mold 2.

This device for thermoforming a sheet reduces the probability of an unplanned production stoppage to a minimum.

The invention claimed is:

1. A device for thermoforming a sheet, comprising: first and second molds, the first mold comprising a stationary housing, a movable plug support plate which is movably supported in the stationary housing, and a plurality of heatable plugs projecting from the plug support plate, the plugs arranged a predetermined distance from each other, the plug support plate comprising an induction element of inductively heatable material; and
a plurality of stationary induction coils mounted in the stationary housing adjacent to the movable plug support plate.

2. The device according to claim 1, wherein the alternating magnetic field of the induction coils comprises a frequency range of 25 to 50 kHz.

3. The device according to claim 1, wherein the at least one induction element delivers an output of 400 to 800 W.

4. The device according to claim 1, wherein the housing comprises a pressure plate with through-openings for the plugs.

5. The device according to claim 1, wherein the at least one induction element is formed as a thin plate, which is connected in a thermally conductive manner to a base body of the plug support plate.

6. The device according to claim 1, wherein it comprises several induction elements which are formed as strip conductors.

7. The device according to claim 6, wherein the induction elements are straight and are arranged on a base body of the plug support plate at a predetermined distance from each other.

8. The device according to claim 7, wherein the induction elements are formed as round bars or as square bars and are introduced into recesses in the base body of the plug support plate.

9. The device according to claim 1, wherein the at least one induction element is made of a material of high electrical conductivity.

10. The device according to claim 1, wherein the plug support plate comprises a base body of a thermally conductive material.

11. The device according to claim 1, further comprising a sensor for measuring the temperature.

12. The device according to claim 11, wherein the sensor is arranged stationary and works without contact.

* * * * *